United States Patent
Kang et al.

(10) Patent No.: US 6,650,723 B1
(45) Date of Patent: Nov. 18, 2003

(54) DOUBLE STRIP MIXING GRID FOR NUCLEAR REACTOR FUEL ASSEMBLIES

(75) Inventors: Heungseok Kang, Taejon-si (KR); Keenam Song, Taejon-si (KR); Kyungho Yoon, Taejon-si (KR); Hyungkyu Kim, Taejon-si (KR); Taehyun Chun, Taejon-si (KR); Dongseok Oh, Taejon-si (KR); Wangkee In, Taejon-si (KR); Yeonho Jung, Taejon-si (KR)

(73) Assignees: Korea Atomic Energy Research Institute, Taejon-si (KR); Korea Electric Power Corporation, Seoul (KR)

( * ) Notice: Subject to any disclaimer, the term of this patent is extended or adjusted under 35 U.S.C. 154(b) by 0 days.

(21) Appl. No.: 09/862,383

(22) Filed: May 22, 2001

(30) Foreign Application Priority Data

Mar. 21, 2001 (KR) ........................ 2001-14474

(51) Int. Cl.$^7$ ................................ G21C 3/352
(52) U.S. Cl. ................ 376/439; 376/438; 376/440; 376/441; 376/442; 376/443; 376/449; 376/454; 376/462
(58) Field of Search ................ 376/438, 439, 376/440, 441, 442, 443, 449, 454, 462

(56) References Cited

U.S. PATENT DOCUMENTS

| | | | | |
|---|---|---|---|---|
| 4,089,741 A | * | 5/1978 | Patterson et al. ............ 29/469 |
| 4,692,302 A | * | 9/1987 | DeMario et al. ............ 376/439 |
| 4,726,926 A | | 2/1988 | Patterson et al. ............ 376/439 |
| 4,756,878 A | | 7/1988 | King et al. ............ 376/439 |
| 4,849,161 A | * | 7/1989 | Brown et al. ............ 376/313 |
| 5,084,237 A | * | 1/1992 | Patterson et al. ............ 376/439 |
| 5,180,548 A | * | 1/1993 | Verdier ............ 376/438 |
| 5,625,657 A | * | 4/1997 | Gallacher ............ 376/261 |
| 6,130,927 A | | 10/2000 | Kang et al. ............ 376/462 |
| 6,167,105 A | * | 12/2000 | Yoon et al. ............ 376/441 |
| 6,236,701 B1 | * | 5/2001 | Nylund ............ 376/443 |
| 6,236,702 B1 | * | 5/2001 | Chun et al. ............ 376/439 |
| 6,278,758 B1 | * | 8/2001 | Imaizumi et al. ............ 376/438 |
| 6,278,759 B1 | * | 8/2001 | Yoon et al. ............ 376/439 |
| 6,393,087 B1 | * | 5/2002 | Oh et al. ............ 376/438 |
| 6,421,407 B1 | * | 7/2002 | Kang et al. ............ 376/439 |

FOREIGN PATENT DOCUMENTS

| | | | |
|---|---|---|---|
| DE | 1916433 | * | 10/1970 |
| EP | 0415205 | * | 3/1991 |
| EP | 000534254 A | * | 3/1993 |
| WO | WO 91/13442 | * | 9/1991 |

* cited by examiner

Primary Examiner—Michael J. Carone
Assistant Examiner—John Richardson
(74) Attorney, Agent, or Firm—Bachman & LaPointe, P.C.

(57) ABSTRACT

A double strip mixing grid for nuclear reactor fuel assemblies is disclosed. This grid is fabricated by intersecting at right angles a plurality of double strips, each fabricated by welding two thin sheets together into a single structure with coolant channels. The mixing grid, having the channels, effectively mixes low temperature coolant with high temperature coolant within a fuel assembly, thus improving the thermal efficiency of the fuel assemblies. This mixing grid also effectively prevents the coolant from being partially overheated, thus improving the soundness of nuclear reactors. This mixing grid also has swirling flow blades and/or lateral flow blades to further improve the thermal efficiency of the fuel assembly. This mixing grid elastically supports the fuel rods by the sheets of the double strips, collaterally acting as positioning springs. Each double strip also has a vertical slot at a position around each channel, and so the elastic range of the positioning springs of the grid is preferably enlarged. The slots also enlarge the fuel rod contact area of the grid, thereby effectively protecting the fuel rod from fretting corrosion. In addition, the intersecting strips are welded together at the intersections through a continuous welding process, thus improving the mechanical strength of the grid.

8 Claims, 11 Drawing Sheets

DOUBLE STRIP MIXING GRID FOR NUCLEAR REACTOR FUEL ASSEMBLIES

BACKGROUND OF THE INVENTION

1. Field of the Invention

The present invention relates, in general, to spacer grids used for placing and supporting fuel rods in nuclear reactor fuel assemblies and, more particularly, to a double strip mixing grid used in such nuclear reactor fuel assemblies and designed to effectively deflect and mix coolants together so as to improve the heat transferring effect between the fuel rods and the coolants, the mixing grid also designed to improve its fuel rod support performance so as to effectively protect the fuel rods from vibration and fretting failure of the fuel rods, and improve to effectively resist laterally directed forces acting thereon.

2. Description of the Prior Art

Figure 1:
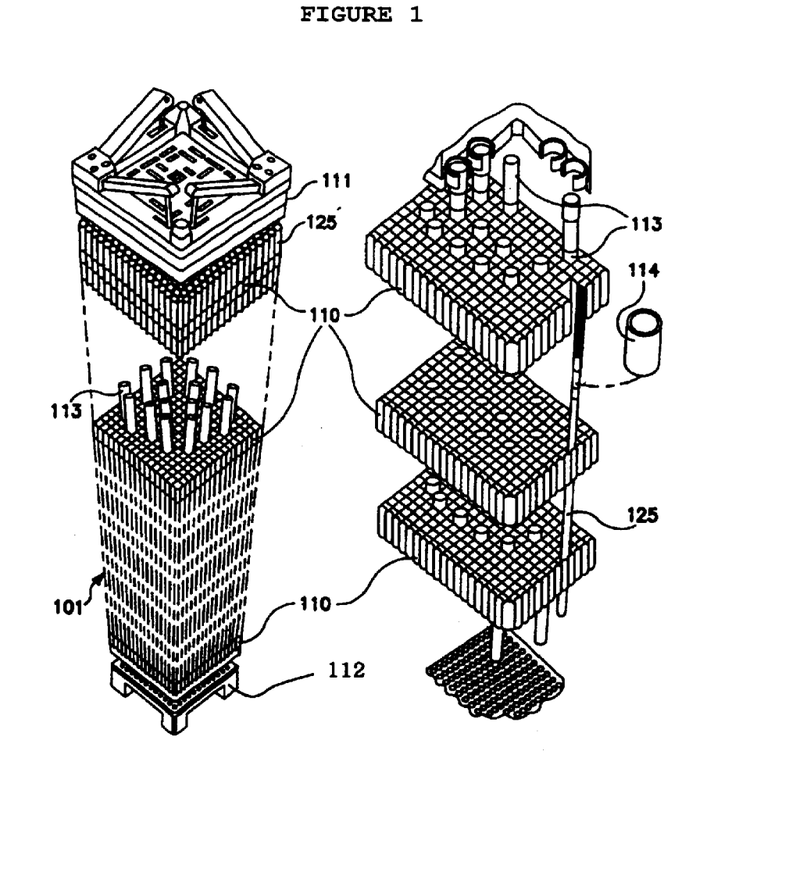
FIG. 1 is a perspective view, showing the construction of a typical nuclear fuel assembly for use in pressurized light water reactors.

In typical nuclear reactors, a plurality of elongated nuclear fuel rods 125 are regularly and parallelly arranged in a fuel assembly 101 having a square cross-section. In such a case, for example, fourteen, fifteen, sixteen or seventeen fuel rods 125 are regularly arranged along each side of the square cross-section, thus forming a 14×14, 15×15, 16×16, or 17×17 array as shown in FIG. 1.

In order to place and support the fuel rods 125 within the nuclear fuel assembly 101, a plurality of spacer grids 110 are used. Each of such grids 110 is produced by intersecting a plurality of inner strips at right angles to form an egg-crate pattern, and welding the intersected strips at their intersections prior to encircling the periphery of the grid 110 with four perimeter strips. The top and bottom of the fuel assembly 101 are, thereafter, covered with top and bottom pallets 111 and 112. Therefore, the nuclear fuel assembly 101 is protected from any external loads acting on the top and bottom thereof. In the assembly, the spacer grids 110 and the pallets 111 and 112 are integrated into a single structure using a plurality of guide tubes 113. The elongated fuel rods 125, placed and supported within the fuel assembly 101 by the grids 110, are typically fabricated such that a fissionable fuel material, such as uranium core 114, is contained in a hermetically sealed elongated zircaloy tube, known as the cladding.

Figure 2:
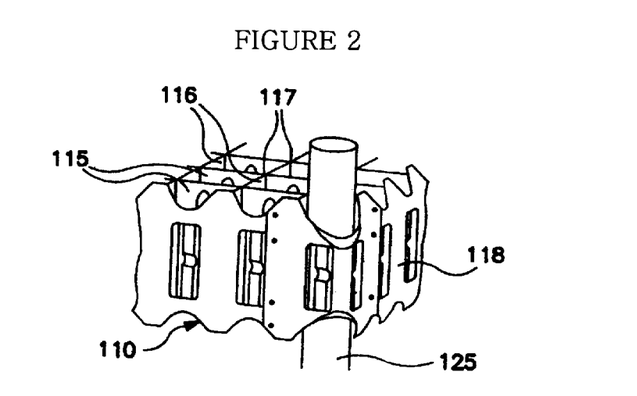
FIG. 2 is a partial perspective view, showing a typical spacer grid used for placing and supporting elongated fuel rods within the fuel assembly of FIG. 1; FIG.

The above spacer grids 110 are each fabricated as follows. As best seen in FIG. 2, two sets of inner strips 115 and 116, individually having a plurality of notches at regularly spaced portions, are assembled with each other by intersecting the two sets of strips 115 and 116 at the notches, thus forming a plurality of four-walled cells. Each of the cells has four intersections 117. The assembled strips 115 and 116 are, thereafter, welded together at the intersections 117 prior to being encircled with the perimeter strips 118. A desired spacer grid 110 with such four-walled cells is thus fabricated.

Figure 3:
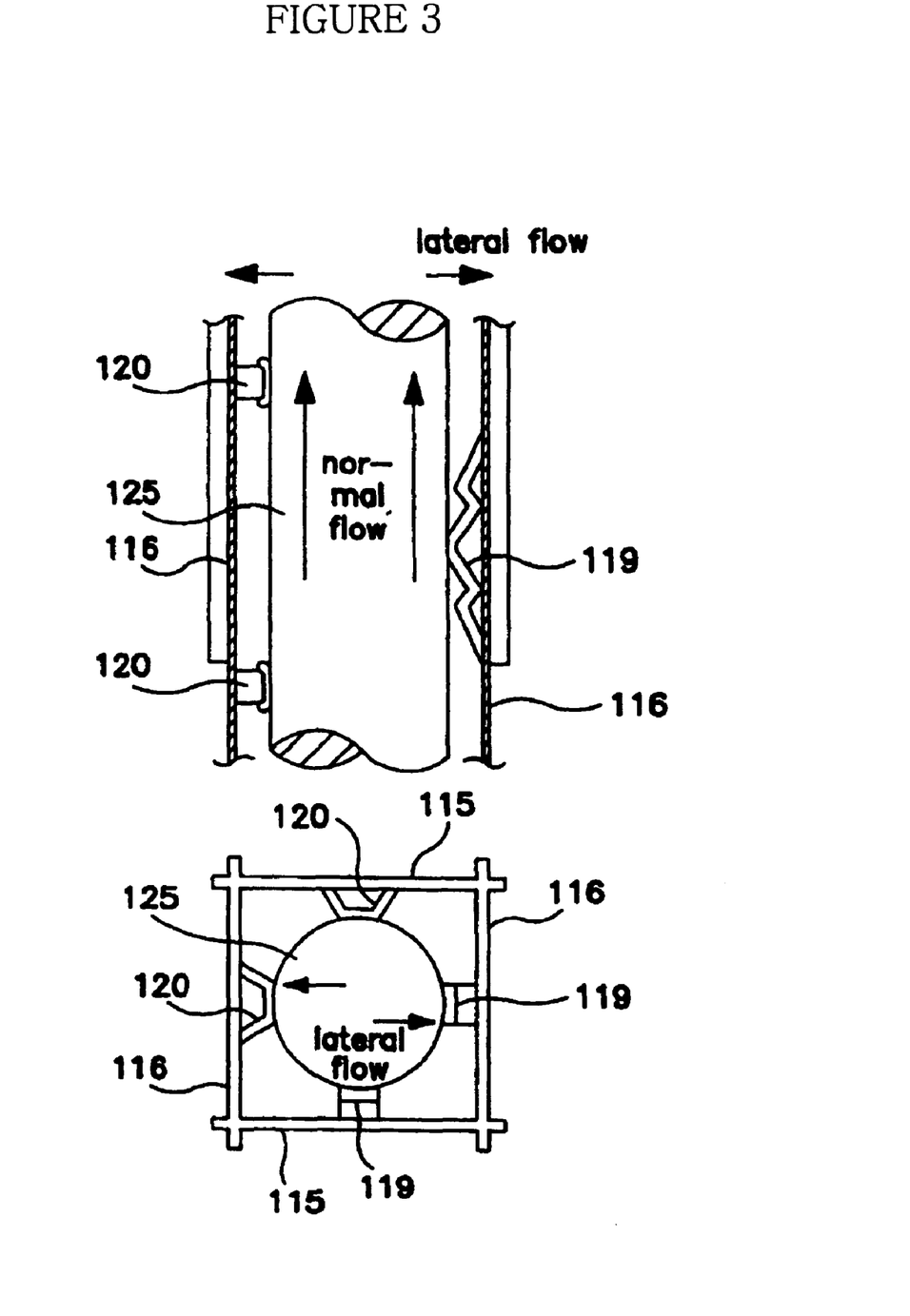
FIG. 3 shows a fuel rod, placed and supported by positioning springs and dimples within a four-walled cell of the grid of FIG. 2, in a front view and a sectional view.

As shown in FIG. 3, a plurality of positioning springs 119 and a plurality of positioning dimples 120 are integrally formed on or attached to the inner strips 115 and 116. In such a case, the springs 119 and the dimples 120 extend inwardly with respect to each of the four-walled cells. The dimples 120 are more rigid than the springs 119. In each of the four-walled cells, the positioning springs 119 force a fuel rod 125 against associated dimples 120, thus elastically positioning and supporting the fuel rod 125 at four points within each of the cells.

In such a typical nuclear fuel assembly 101, a plurality of spacer grids 110 having the above-mentioned construction are regularly and perpendicularly arranged along the axes of the fuel rods 125 at right angles, thus placing and supporting the fuel rods 125 within the assembly 101 at multiple points. That is, the spacer grids 110 form a multi-point support means for placing and supporting the fuel rods 125 within a nuclear fuel assembly 101.

In the typical nuclear fuel assembly 101, the positioning springs 119 elastically and lightly force the fuel rods 119 against the dimples 120 such that the fuel rods 125 are slidable on the support points of both the springs 119 and the dimples 120 when the fuel rods 125 are elongated due to thermal expansion or irradiation-induced growth of the fuel rods 125 within the fuel assembly 101.

Figure 4:
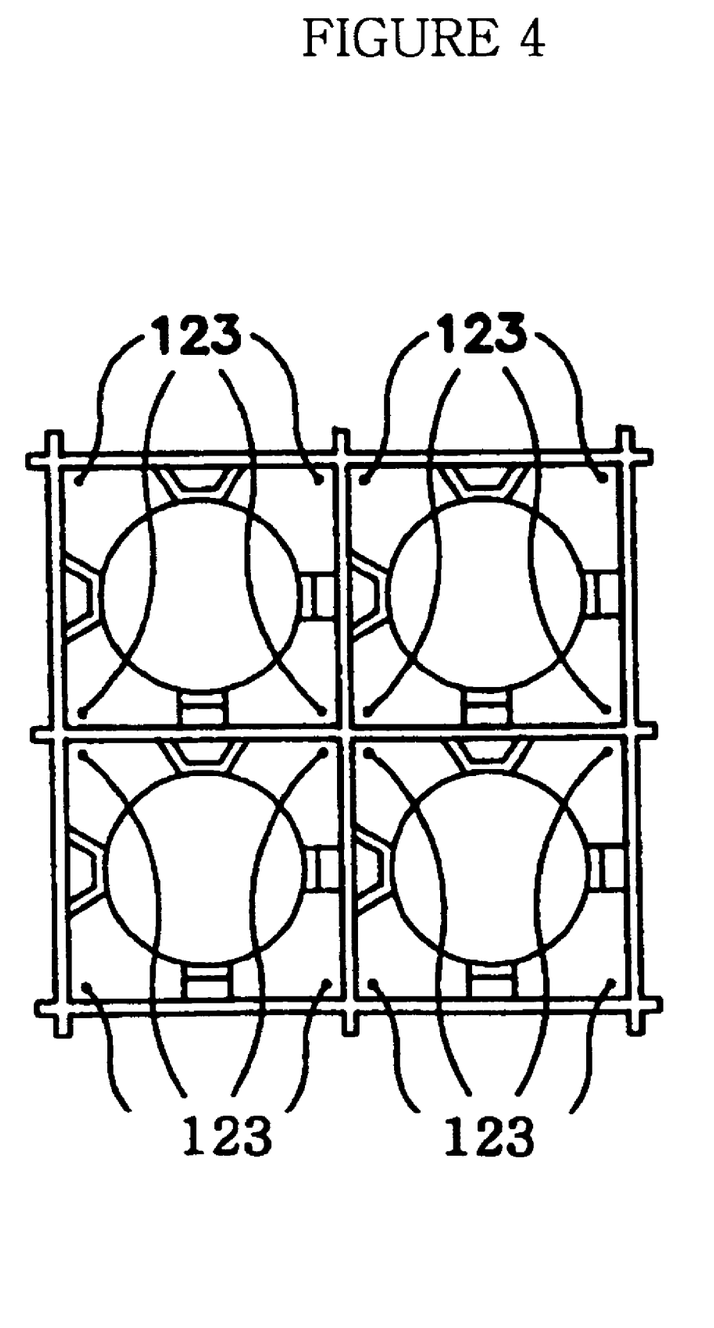
FIG. 4 is a sectional view, showing four fuel rods each laced and supported within a four-walled cell of the grid of FIG. 2, with coolant passages formed around each fuel rod within each cell.

When the fuel rods 125 are fixed to the spacer grids 110 at the support points of the grids 110, the fuel rods 125 may be bent at portions between the support points, thus undesirably reducing the intervals between the fuel rods 125 of the assembly 101 as shown in FIG. 4.

In some typical nuclear reactors using water as coolant, such as in the case of the nuclear reactors recently used in Korea, water receives thermal energy from the fuel rods 125 prior to converting the thermal energy into desired electric energy through a plurality of processes.

During an operation of a nuclear fuel assembly 101 of such a reactor, water or liquid coolant is primarily introduced into the assembly 101 through an opening formed on the core supporting lower plate of the reactor. In the assembly 101, the coolant flows upwardly through the passages, defined between the fuel rods 125, and receives thermal energy from the hot fuel rods 125.

The sectioned configuration of the coolant passages formed in the fuel assembly 101 is shown in FIG. 4.

In a conventional nuclear reactor, the amounts of thermal energy, generated from different portions of a nuclear fuel assembly 101, are not equal to each other. Since the fuel assembly 101 has a rectangular configuration, with a plurality of elongated, parallel fuel rods 125 closely set within the assembly 101 while being spaced apart from each other at irregular intervals, the temperature of coolant flowing around the fuel rods 125 is variable in accordance with positions of coolant currents relative to the rods 125.

That is, the amount of thermal energy received by water flowing around the corners 123 of each four-walled cell-is less than that received by water flowing around the fuel rods 125. The coolant passages of typical fuel assemblies 101 thus undesirably have low temperature regions.

Such low temperature regions reduce the thermal efficiency of the nuclear reactor. The coolant passages of the fuel assemblies 101 may also have partially overheated regions at positions adjacent to the fuel rods 125 having a high temperature. Such partially overheated regions deteriorate soundness of the assemblies 101.

In order to prevent such partially overheated regions from existing in a nuclear fuel assembly, it is necessary to design the spacer grid such that a uniform temperature distribution is formed in the fuel assembly. The grid must be also designed to effectively deflect and mix the coolant within the fuel assembly. Such effectively mixed coolant makes uniform the increase in enthalpy and maximizes the core output.

Typical examples of such designed spacer grids are disclosed in Korean Patent Publication Nos. 91-1978 and 917921.

In the spacer grids disclosed in the above-mentioned Korean patents, so-called "mixing blades" or "vanes" are attached along the upper edges of the intersecting strips of each grid, and are used for mixing coolants within the fuel assembly. That is, the mixing blades or vanes allow the coolant to flow laterally, in addition to normally flowing in an axial direction, as shown in FIG. 3, and so the coolants are effectively, mixed with each other between the coolant channels and between the lower temperature regions and the partially overheated regions of the fuel-assembly.

In the prior art, the techniques for mixing the coolants with each other between the coolant channels and between the lower temperature regions and the partially overheated regions of the fuel assembly using such mixing blades or vanes are classified into two types: the first technique using large-scaled mixing blades for creating a lateral flow of coolant and the second technique using vanes provided at the intersections for creating a swirling flow of coolant. In the first technique, the coolants, axially flowing along the elongated fuel rods within a fuel assembly, partially collide against the large-scaled mixing blades so as to flow laterally, in addition to normally flowing in the axial direction. In the second technique, a plurality of vanes are provided at the intersections of the spacer grid for creating the, swirling flow of coolants.

However, the conventional two techniques for mixing the coolants with each other between the channels using such mixing blades or vanes are problematic in that the pressure of the coolants is undesirably reduced in inverse proportion to the expected coolant mixing effect, and so the two techniques are. undesirably limited in their coolant mixing effects.

That is, the wake stream, disturbing the main flow of the coolants, or the vortex flow of the coolants, generated at. positions around the bent portions of the mixing blades or vanes, is enhanced in proportion to the size or the bending angle of the mixing blades or vanes, which is enlarged for enhancing the lateral flow or swirling motion of the coolants within a nuclear fuel assembly. Therefore, the pressure of the coolants in such a case is reduced to limit the enhancement of the desired lateral flow or the desired swirling motion of the coolants. This limits the size and bending angles of the mixing blades or the vanes, and limits the thermal hydraulic efficiency of the nuclear fuel assembly.

In addition, a double strip mixing, grid comprising two sets of intersecting inner strips individually consisting of two sheets specifically deformed and integrated together to define coolant channels between them, has been proposed. In this double strip mixing grid, the upper or lower portion of each channel is inclined relative to the axes of the fuel rods at an angle of inclination, thus producing a swirling motion of coolant at the inlet and outlet of the channels. Such a swirling motion of coolant improves the heat transferring effect between the fuel rods and the coolant within a nuclear fuel assembly.

Such a double strip mixing grid having the two sets of intersecting inner strips is referred to U.S. Pat. No. 4,726, 926, Korean Patent No. 265,027, and U.S. Pat. No. 6,130, 927.

The above U.S or Korean grids, designed to form a lateral flow of coolants or to deflect and mix the coolants within a nuclear fuel assembly, are somewhat advantageous in that they more effectively mix the coolants and improve the heat transferring effect between the fuel rods and the coolants within a nuclear fuel assembly. However, such a conventional double strip mixing grid is problematic in that the lateral flow or mixing of coolants regrettably vibrates the elongated, parallel, closely spaced fuel rods within the assembly.

In the conventional spacer grids for nuclear fuel assemblies with the fuel rods 125 supported by both the positioning springs 119 and the positioning dimples 120 within the four-walled cells of the grids 110, the fuel rods 125 during an operation of a nuclear fuel assembly 101 briefly and periodically interfere with the intersecting strips of the grids due to vibrations caused by the lateral flow of coolants. When the fuel rods 125 are so vibrated over a lengthy period of time, the claddings of the fuel rods 125 are repeatedly and frictionally abraded at their contact parts at which the fuel rods 125 are brought into contact with the springs and dimples of the grids. The claddings are thus reduced in their thickness so as to be finally perforated at said contact parts. Such an abrasion of the fuel rods is so-called fretting wear in the art.

Detailed description of such a fretting wear may be referred to Korean Patent Publication No. 94-3799.

The laterally directed force caused by the mixing blades of the grids is in proportion to the coolant mixing effect, and directly affects the heat transferring effect of nuclear reactors. However, such a laterally directed force of the mixing blades also proportionally increases the amplitude of vibration of the fuel rods. This may cause damage to the fuel rods.

The important factors necessary to consider while designing the grids for use in nuclear fuel assemblies are improvement in both the fuel rod supporting function of the grids and the buckling strength capable of resisting such a laterally directed force acting on the grids.

During an operation of a nuclear reactor, the fuel assemblies may be vibrated laterally due to load acting on the assemblies and this causes interference between the assemblies. Therefore, the grids of the fuel assemblies may be impacted due to such interference between the fuel assemblies as disclosed n U.S. Pat. No. 4,058,436.

In the prior art, the grid's buckling strength, resisting a lateral load acting on the grid, is undesirably reduced since the grid strips have to be partially removed, for example, through a stamping process at a plurality of portions so as to form positioning springs and dimples of the grid within a fuel assembly. Such cut-away portions reduce the effective cross-sectional area of the grid capable of resisting impact, and reduce the buckling strength of the grid.

In a grid disclosed in U.S. Pat. No. 5,243,634, the positioning springs are individually integrated with an associated grid strip at one point, thus forming a cantilever structure. Such a cantilever spring is more flexible than a simple spring, which is integrated with a grid strip at opposite ends thereof.

In the mixing grid disclosed in the above-mentioned U.S. Pat. No. 4,726,926, the deformed portions, provided on the sheets of the intersecting grid strips for forming the channels for coolant, collaterally act as channel-shaped positioning springs used for placing and supporting the fuel rods within the four-walled cells of the grid.

Since the sheets of the strips are not cut away, but deformed to form such channel-shaped springs, flexibility of such channel-shaped springs is exceedingly-less in comparison with the above-mentioned cantilever springs, thus failing to provide desired flexibility expected by conventional positioning springs. The channel-shaped springs thus act as dimples rather than springs. Therefore, the above-mentioned mixing grid, having such channel-shaped dimples and supporting the elongated fuel rods using only the channel-shaped dimples without having springs, is problematic in that said dimples may cause the fuel rods to be undesirably bent when the fuel rods are elongated due to the irradiation-induced growth during an operation of the reactor. In addition, this mixing grid is reduced in its elastic range, wherein the grid effectively and elastically supports the fuel rods in the fuel assembly, and so the mixing grid may be apt to lose its spring function during a grid manufacturing process, during a fuel rod installing process, or when the fuel rods are elongated due to the irradiation-induced growth during an operation of the reactor. In such a case, the mixing grid may undesirably lose its function of effectively placing and supporting the fuel rods within a nuclear fuel assembly or restricting undesired vibration of the fuel rods.

SUMMARY OF THE INVENTION

Accordingly, the present invention has been made keeping in mind the above problems occurring in the prior art, and an object of the present invention is to provide a double strip mixing grid for nuclear reactor fuel assemblies, which has mixing blades used in a conventional single strip spacer grid, in addition to having coolant channels used for effectively mixing the low temperature coolant with the high temperature coolant in the same manner as disclosed in Korean patent No. 265,027, thus having advantages expected from both the mixing blades of the conventional single strip spacer grid and the coolant channels of the conventional double strip mixing grid, and remarkably improving thermal efficiency of the fuel assemblies; and which has an enhanced spring function of supporting the fuel rods within the fuel assemblies, thus almost completely preventing fretting wear of the fuel rods caused by hydraulic vibration of the fuel rods within the nuclear fuel assemblies.

Another object of the present invention is to provide a double strip mixing grid for nuclear reactor fuel assemblies, of which the intersecting strips are slightly reduced in thickness, but are not cut away at any portion, thus maintaining a desired effective sectional area thereof and thereby having a desired buckling strength capable of effectively resisting lateral load acting thereon, and which improves the thermal hydraulic strength and mechanical strength of the fuel assemblies.

A further object of the present invention is to provide a double strip mixing grid for nuclear reactor fuel assemblies, of which the intersecting strips have a reduced thickness and a substantially longer interval between their fuel rod support points, and which maximizes the elastic range of the positioning springs, and increases the number of fuel rod contact points and fuel rod contact areas, thus more effectively placing and supporting the fuel rods within the fuel assembly, and in which the fuel rods are not supported by only the positioning springs; and so the elastic displacement of the fuel rods is more effectively supported by the grid of this invention in comparison with a known grid using only such positioning springs, thus overcoming the problems experienced in the nozzle-type positioning springs or dimples having an excessively high strength.

In order to accomplish the above objects, the present invention provides a double strip mixing grid for nuclear reactor fuel assemblies, comprising a plurality of inner double strips, each fabricated by integrating two thin sheets together into a single structure having a plurality of coolant channels and intersecting each other at a predetermined angle to form a desired mixing grid having a plurality of four-walled cells, wherein each of the strips is partially cut away at predetermined portions along its top edge to form nozzles of the coolant channels.

In the double strip mixing grid of this invention, each of the intersecting double strips is fabricated by integrating two thin sheets together into a single structure having the coolant channels. The cross-sectional area of each of the coolant channels of each strip consisting of the two thin sheets is gradually increased from its bottom end, having a predetermined cross-sectional area, and is maximized at the middle portion of the -channel supporting the fuel rod, and is gradually reduced to become zero at the top end of the strip.

The top end of the strip is partially cut away at a position around the outlet end of each channel, thus forming an outlet nozzle of the channel. The coolant flows from the nozzle of the channel, and allows the coolant flowing outside the channels to smoothly flow without forming any vortexes.

In the double strip mixing grid of this invention, the coolant flowing from the nozzles of the channels collides. against the mixing blades provided on the strip at positions around the nozzles, and so a desired swirling flow and/or a desired lateral flow of coolant is created within the fuel assembly. However, the mixing blades also form undesired vortexes in the coolant.

In the mixing grid of this invention, the coolant flowing outside the channels is mixed with the coolant flowing from the channels prior to colliding against the mixing blades. This mixing grid thus allows the coolant to smoothly flow within the fuel assembly without forming such undesired vortexes in the coolant.

In the double strip mixing grid of this invention, the cross-sectional area of each of the coolant channels of each strip is gradually increased from its bottom end, and is maximized at its middle portion supporting the fuel rod, and is gradually reduced in a direction toward the top end of the strip. In order to prevent the sheets of the strips from having an excessively high strength at positions around the middle portions of the channels supporting the fuel rods, a vertical slot is formed on each sheet of the strip at a position around each channel, thus improving the spring function of the fuel rod contact portions of the double strips. Due to the slots, the double strips of the grid more effectively support the fuel rods while holding the rods at positions around the slots, and so the mixing grid of this invention enlarges its fuel rod contact area, and effectively protects the fuel rods from a fretting corrosion.

In the double strip mixing grid of this invention, each of the strips has a thickness ranging from 0.25 mm to 0.40 mm, with each of the channels having a width ranging from 7 mm to 10 mm.

In addition, the intersecting inner strips of the mixing grid according to this invention may be preferably and continuously welded together at their intersections through a continuous welding process or a seaming process, in addition to a conventionally performed alternate spot welding process by which big weld nugget is normally formed at the intersection. Therefore, it is possible to improve the mechanical strength of the mixing grid, such as the impact strength or bending strength of the grid.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 5:
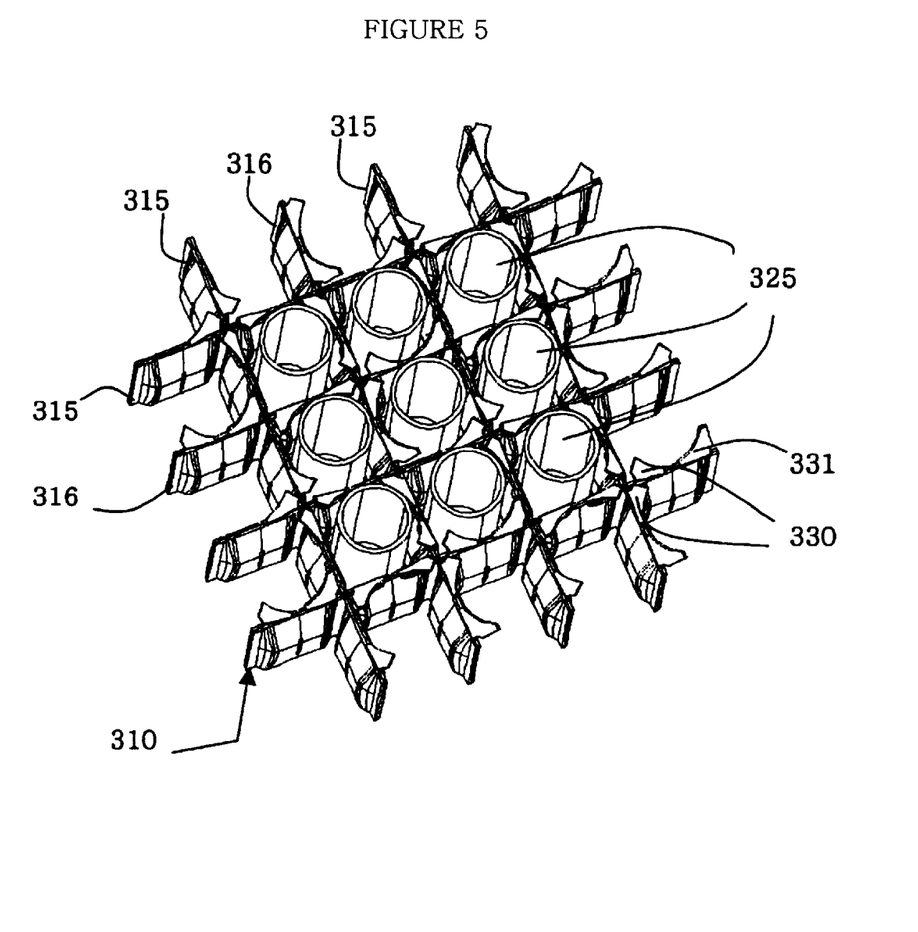
FIG. 5 is a perspective view of a double strip mixing grid or nuclear reactor fuel assemblies having a 5×5 array in accordance with the primary embodiment of the present invention.
Figure 6:
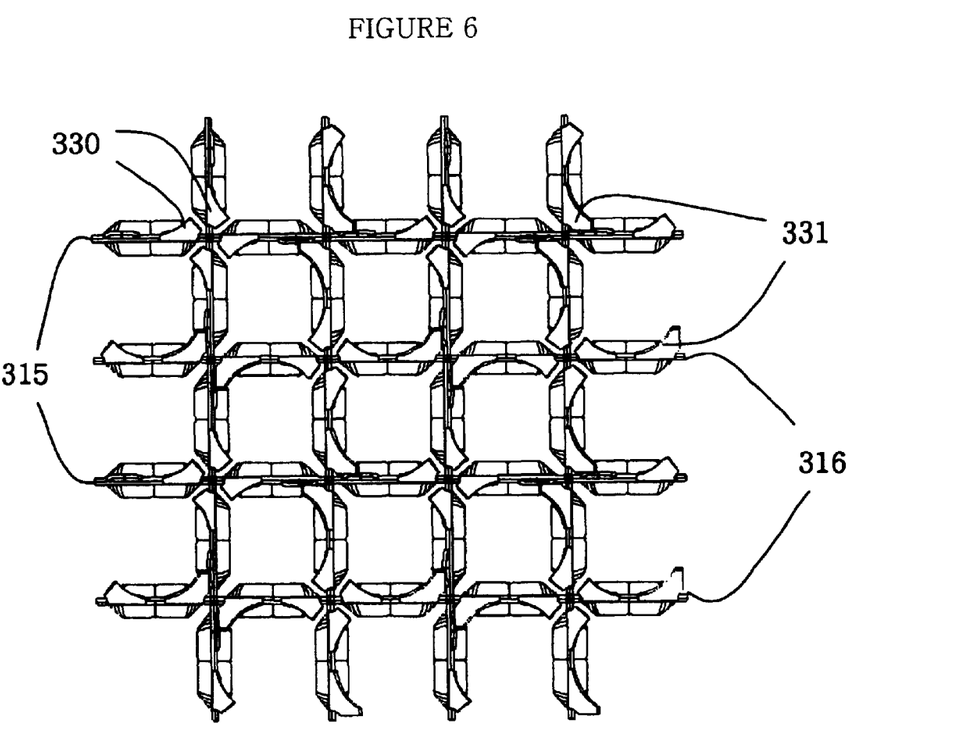
FIG. 6 is a plan view of the double strip mixing grid of FIG. 5, with fuel rods removed from the grid.

FIG. 5 is a perspective view of a double strip mixing grid for nuclear reactor fuel assemblies having a 5×5 array in accordance with the primary embodiment of the present invention. FIG. 6 is a plan view of the double strip mixing grid of FIG. 5, with fuel rods removed from the grid.

Figure 7:
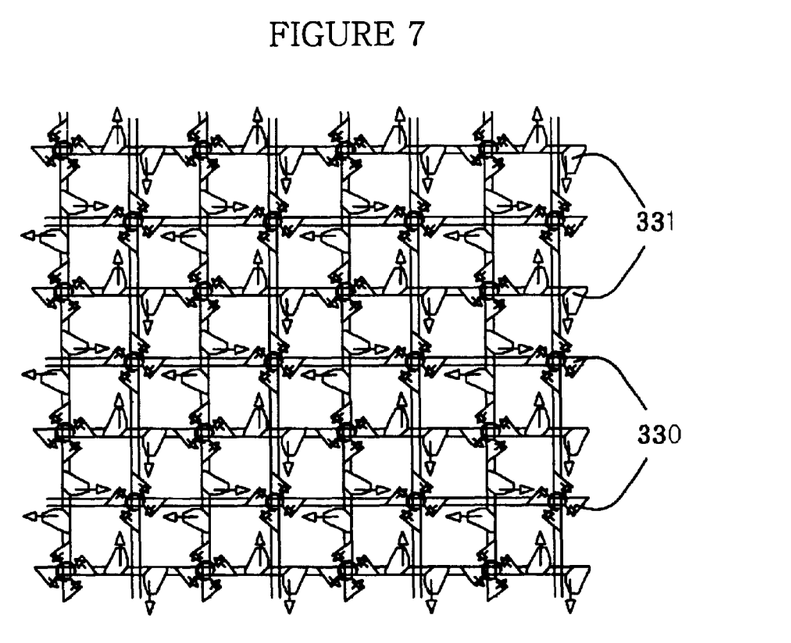
FIG. 7 is a plan view of the double strip mixing grid of FIG. 5, showing the operational function of mixing blades of the grid.
Figure 8:
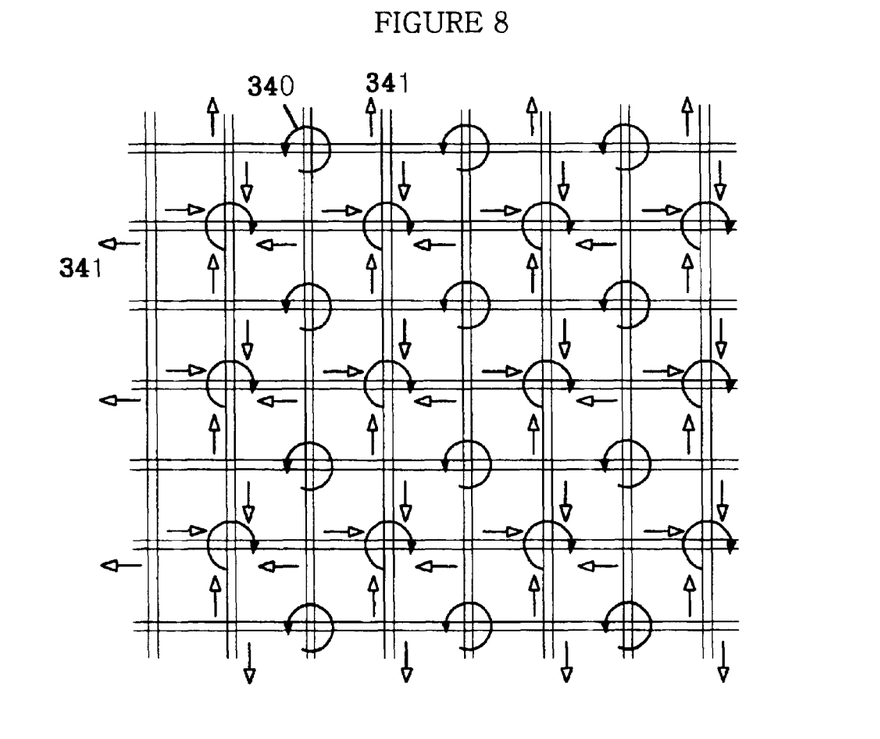
FIG. 8 is a plan view of the double strip mixing grid of FIG. 5, showing the coolant currents formed by the mixing blades of the grid.

FIG. 7 is a plan view of the double strip mixing grid of FIG. 5, showing the operational function of mixing blades of the grid. FIG. 8 is a plan view of the double strip mixing grid of FIG. 5, showing the coolant currents formed by the mixing blades of the grid.

Figure 9:
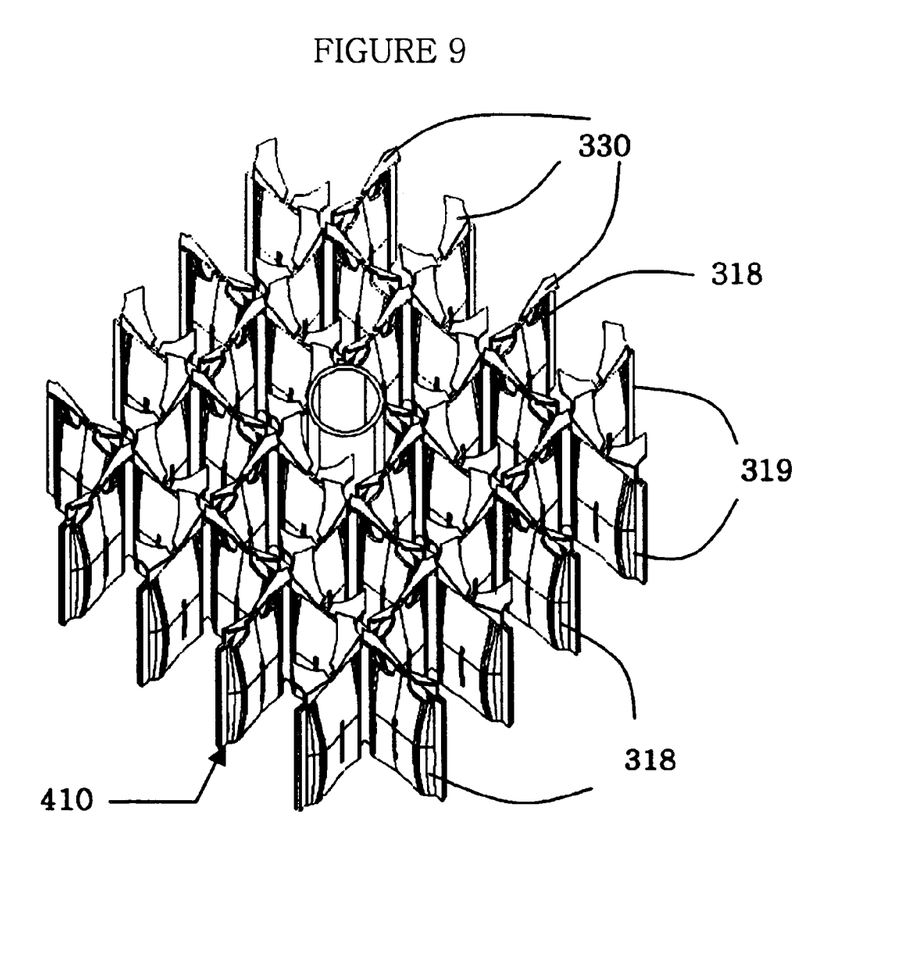
FIG. 9 is a perspective view of a double strip mixing grid for nuclear fuel assemblies having a 5×5 array in accordance with the second embodiment of the present invention.
Figure 10:
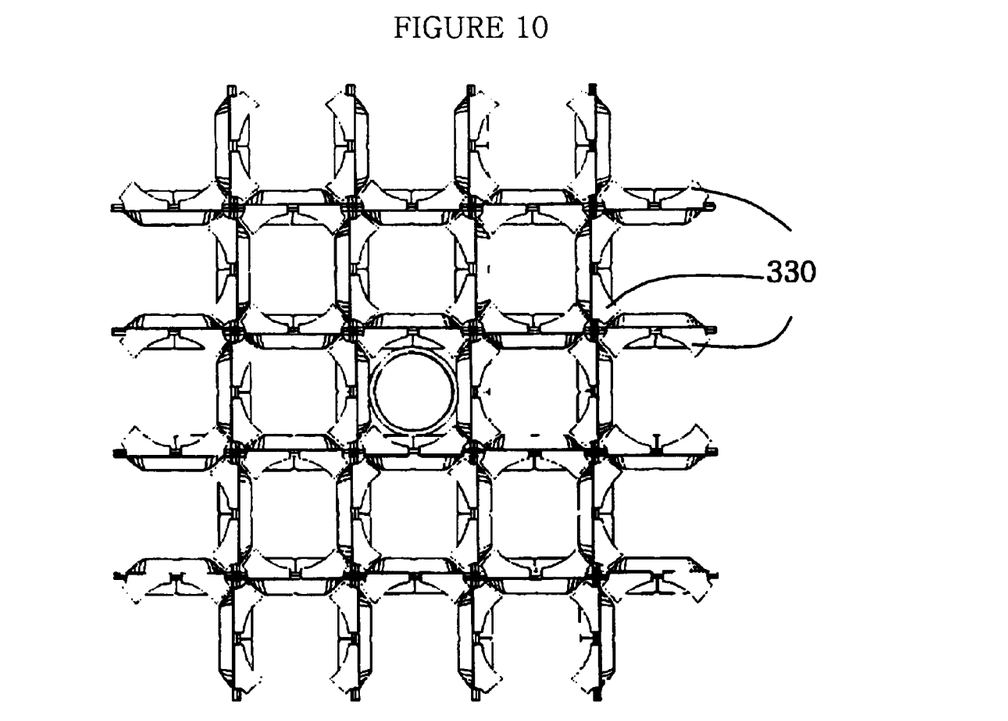
FIG. 10 is a plan view of the double strip mixing grid of FIG. 9, with only one fuel rod set within the grid.

FIG. 9 is a perspective view of a double strip mixing grid for nuclear fuel assemblies having a 5×5 array in accordance with the second embodiment of the present invention. FIG. 10 is a plan view of the double strip mixing grid of FIG. 9, with only one fuel rod set within the central cell of the rid.

Figure 11:
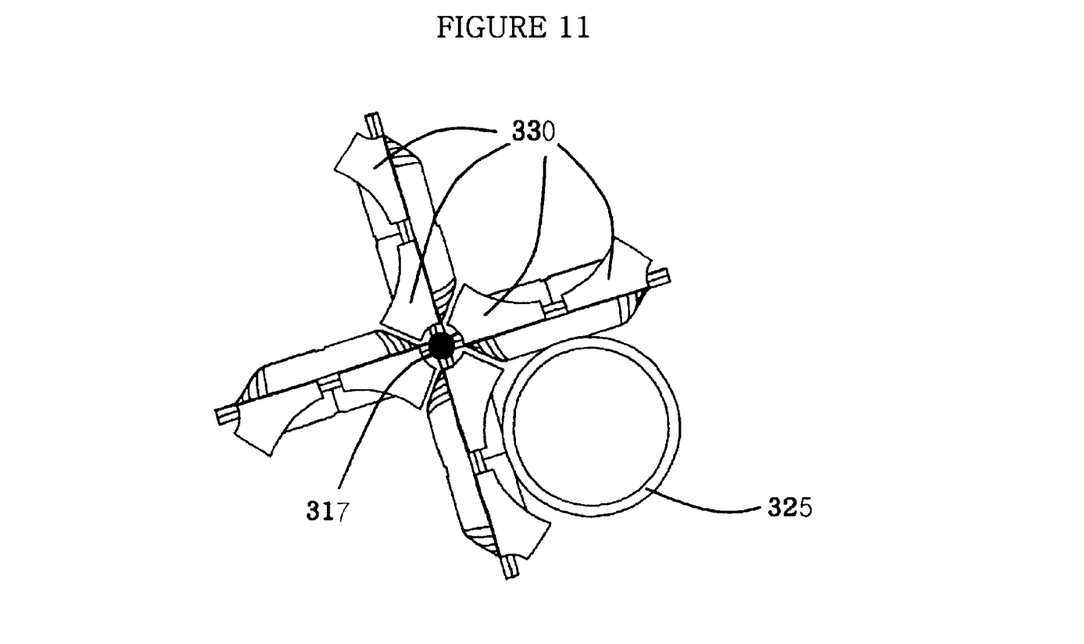
FIG. 11 is a plan view, showing the construction of one intersection of the grid of FIG. 10.
Figure 12:
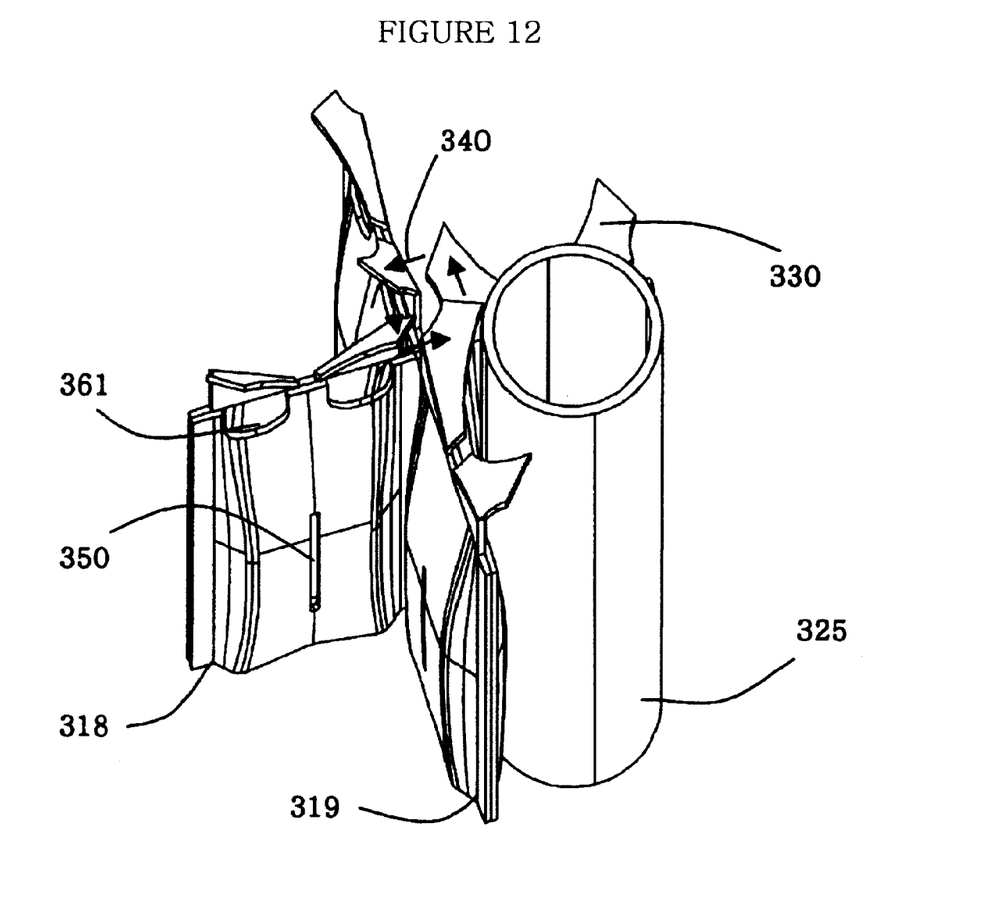
FIG. 12 is a top perspective view of the intersection of FIG. 11.
Figure 13:
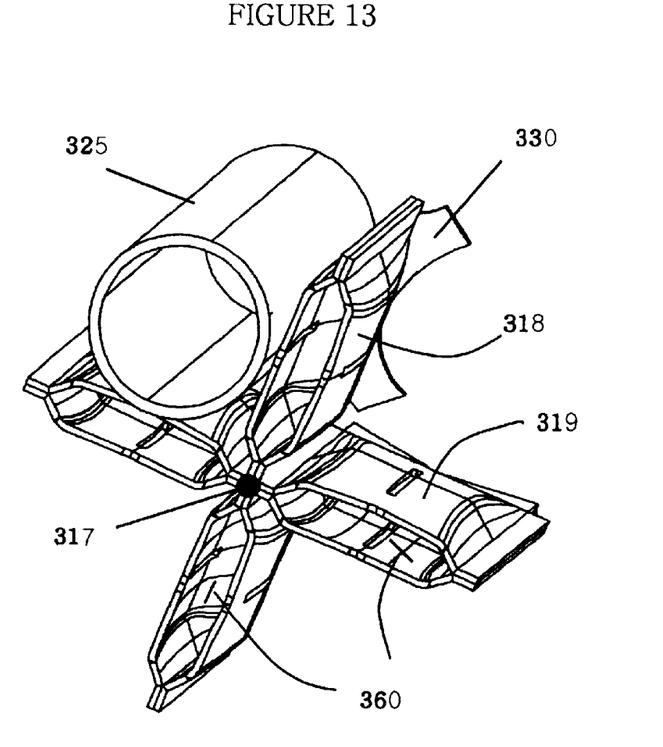
FIG. 13 is a bottom perspective view of the intersection of FIG. 11.

FIG. 11 is a plan view, showing the construction of one intersection of the grid of FIG. 10. FIG. 12 is a top perspective view of the intersection of FIG. 11. FIG. 13 is a bottom perspective view of the intersection of FIG. 11.

Figure 14:
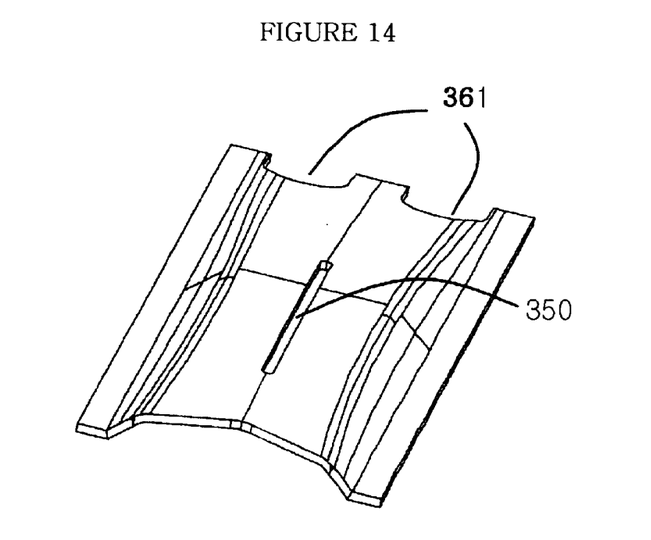
FIG. 14 is a perspective view of a nozzle sheet of each double strip used in the double strip mixing grid of this invention.
Figure 15:
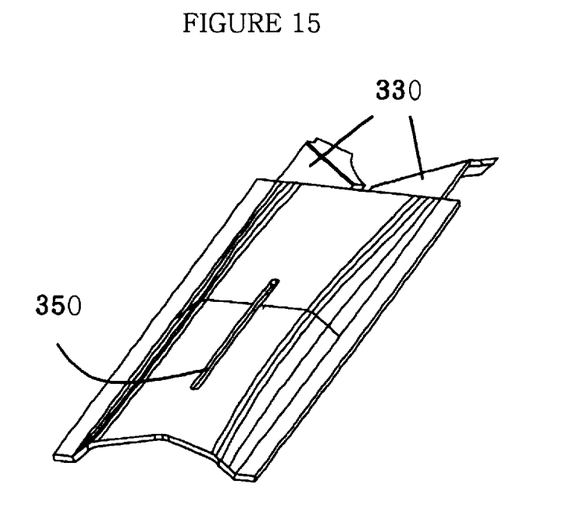
FIG. 15 is a perspective view of a bladed sheet of the double strip of this invention.
Figure 16:
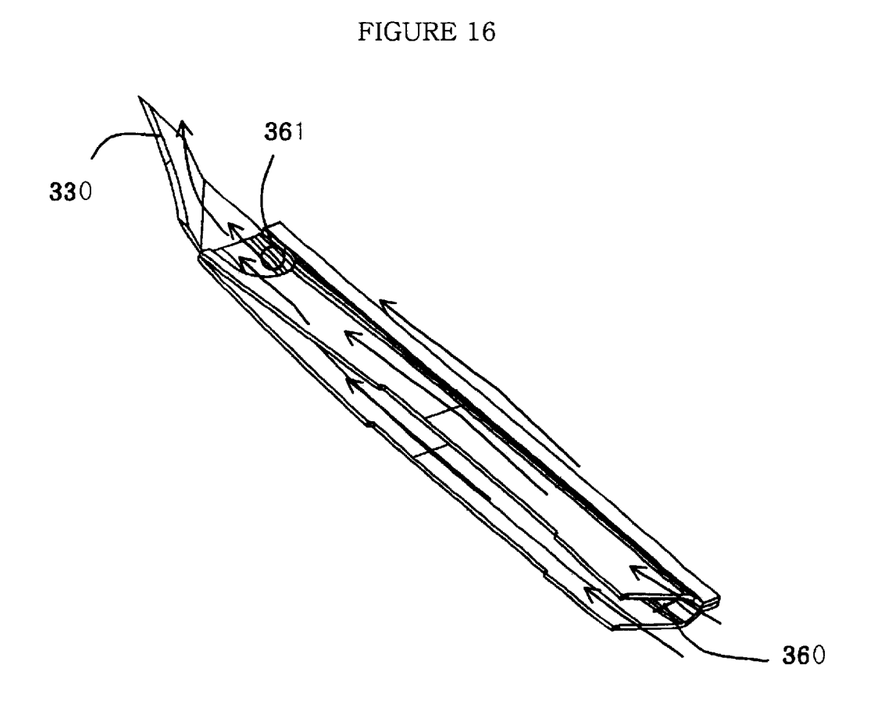
FIG. 16 is a perspective view of the double strip having a coolant channel according to this invention, with the coolant channel being cut along its central axis.

FIG. 14 is a perspective view of a nozzle sheet of each, double strip according to this invention. FIG. 15 is a perspective view of a bladed sheet of the double strip according to this invention. FIG. 16 is a perspective view of a double strip having a coolant channel according to this invention, with the coolant channel, being cut along its central axis.

As shown in the drawings, the double strip mixing grid 310 or 410 according to the preferred embodiments of this invention is used for placing and supporting a plurality of elongated nuclear fuel rods 325 within a nuclear reactor fuel assembly, and comprises two sets of intersecting double inner strips, which are arranged while intersecting each other at right angles prior to being encircled with four perimeter strips, thus forming an egg-crate pattern. Each of the two sets of grid strips is fabricated by integrating two thin sheets together into a single structure while defining a plurality of coolant channels in each of the two strips. In such a case, the two thin sheets of each of the strips are preferably continuously welded together at their junctions. In the double strip mixing grid 310 or 410 of this invention, the outlet of each coolant channel is formed by cutting a predetermined portion of one sheet of each of the two strips at the top edges of the strips. In addition, the cross-sectional area of each of said coolant channels is gradually enlarged in a direction from the inlet to the outlet of the channel, or varies such that it is maximized at a middle portion of the channel supporting a fuel rod within each, four-walled cell. In the double strip mixing grid 310 or 410 of this invention, each of the intersecting strips has a thickness preferably ranging from 0.25 mm to 0.40 mm, while each of the coolant channels has a width preferably ranging from 7 mm to 10 mm.

In the double strip mixing grid 310 of FIG. 5, the two intersecting double strips are each fabricated by integrating two stamped thin sheets together into a single structure while forming a plurality of regularly spaced coolant channels between the two sheets. In the-present invention, each of the thin sheets of the double strip is preferably made of zircaloy, or the alloy of tin, iron, chrome and zirconium. However, it should be understood that the sheets of the strips may be preferably made of inconel that has been typically used as a material of such grid strips in the prior art.

In the mixing grid 310 of FIG. 5, four first grid strips, each having a plurality of swirling flow blades 330 and a plurality of lateral-flow blades 331, regularly intersect four second grid strips, having the same construction as that of the first strips, at right angles prior to being encircled with four perimeter strips, thus forming a double strip mixing grid having a 5×5 array with twenty five cells. In FIG. 5, the perimeter strips are not shown, and so the sixteen outside cells defined by the two sets of intersecting inner strips and the four perimeter strips are not-completely formed. Only nine fuel rods 325 are set in the nine inside cells formed by the intersecting inner strips.

In the double strip mixing grid 310 of FIG. 5, the coolants flowing in the coolant channels of the strips are mixed with the coolants flowing outside the channels at positions around the mixing blades provided at the nozzles of the channels, thus forming swirling flow currents at positions around the swirling flow blades 330 and lateral flow currents at positions around the lateral flow blades 331. The coolants within the nuclear fuel assembly are thus actively and effectively mixed together. In such a case, the swirling flow currents are formed at positions around the intersections of the strips included in the grid, while the lateral flow currents are created between the four-walled cells of the grid.

In such a case, the lateral flow currents of coolants flow toward the swirling flow blades 330, and so the lateral flow currents promote the formation of a swirling flow of coolants, in addition to forcing the coolants to be actively and effectively mixed together.

FIG. 6 is a top plan view, showing the configuration of the double strip mixing grid 310 of FIG. 5 having both the swirling flow blades 330 and the lateral flow blades 331.

The arrangement of both the swirling flow blades 330 and the lateral flow blades 331 on the intersecting double strips of the grid is shown in FIG. 6 in more detail.

In the double strip mixing grid of FIG. 6, a plurality of first inner double strips 315, having only the swirling flow blades, intersect a plurality of second inner double strips 316, having both the swirling flow blades and the lateral flow blades, at right angles to form a desired egg-crate pattern.

In the present invention, it is possible to fabricate a desired double strip mixing grid 310 of FIGS. 5 and 6 by intersecting the two types of double strips 315 and 316 together at right angles prior to encircling the intersected strip structure with the four perimeter strips.

FIGS. 7 and 8 show the blade shape of the double strip mixing grid 310 of FIG. 6, and the coolant currents 340 formed by the swirling flow blades 330 and the coolant current 341 formed by the lateral flow blades 331 of the grid 310. It is possible for those skilled in the art to more clearly understand the style of the coolant currents formed by the two types of blades 330 and 331, in addition to understanding the forming positions of the coolant currents within the grid in more detail.

FIG. 9 shows a double strip mixing grid 410 for nuclear reactor fuel assemblies having a 5×5 array in accordance with the second embodiment of the present invention, with the double strips of the grid 410 having only the swirling flow blades 330 without having the lateral flow blades 331, different from the double strip mixing grid 310 of the primary embodiment. In this drawing, only one fuel rod is set in the central cell of the mixing grid 410 for ease of description.

In the present invention, it is possible to fabricate a double strip mixing grid 410 of the second embodiment using two types of strips 318 and 319. However, it should be understood that the grid 410 of the second embodiment can be formed using one of either type of strips 318 or 319 without affecting the functioning of this invention.

FIG. 10 is a plan view of the double strip mixing grid 410 of FIG. 9, showing both the shape of the mixing blades including the swirling flow blades 330 and the shape of the intersecting double strips in more detail.

FIG. 11 is a plan view, showing the construction of one intersection of the double strip mixing grid 410 of FIG. 10. The shape of the swirling flow blades 330 formed on the grid 410 of the second embodiment is shown in more detail in FIG. 11.

In the present invention, the two sets of inner strips are intersected together at right angles, and are welded together at their intersections through a TIG (Tungsten Inert Gas) welding process or a laser beam welding process, thus forming the welded intersections 317 as shown in FIG. 11 and a desired number of four-walled cells for the fuel rods.

FIGS. 12 and 13 are top and bottom perspective views of the intersection of FIG. 11, respectively. In a nuclear fuel assembly fabricated with the double strip mixing grids of this invention, coolants flow from the bottom edge of each grid to the top edge of each grid while passing through the inside and outside of the coolant channels defined in the two sheets of each of the intersecting double strips, and are mixed together at positions around the nozzles of the coolant channels, provided along the top edge of the grid and having the swirling flow blades, thus forming desired swirling motion of coolants. Such a swirling motion of coolants is shown by the arrows designated by the reference numeral 340 in FIG. 12.

In order to prevent the fuel rod positioning springs of the intersecting double strips included in the mixing grid of this invention from being excessively increased in their strength, a vertical slot 350 is formed on each sheet of the strips at a position around each coolant channel. When each thin sheet of the intersecting double strips, having a thickness of 0.35 mm, is provided with a slot 350, having a width of 0.5 mm and a length of 16 mm, at each of the spring portions, it is possible to decrease the stiffness of the positioning springs by ⅓ times, and increase the elastic range of the springs two times in comparison with a grid not having such slots.

FIG. 14 is a perspective view of a nozzle sheet of each double strip included in the mixing grid of this invention. FIG. 15 is a perspective view of a bladed sheet of the double strip included in the mixing grid of this invention. When the two sheets of FIGS. 14 and 15 are integrated together into a single structure, it is possible to fabricate a double strip having a plurality of coolant channels of FIGS. 11, 12 and 13. In In the present invention; a plurality of first portions having coolant nozzles 361 and a plurality of second portions having swirling flow blades 330 are alternately arranged along each sheet of the double strips of the double strip mixing grid of this invention. The two sheets may be integrated into a first double strip 318 or a second double strip 319 of FIGS. 11, 12 and 13 by arranging the nozzles 361 and the blades 330 at alternating positions. A plurality of first and second double strips 318 and 319 intersect each other at right angles prior to being welded at their intersections, thus forming a desired double strip mixing grid of FIG. 8.

FIG. 16 is a perspective view of a double strip, fabricated by integrating the two sheets of FIGS. 14 and 15 together to form a plurality of regularly spaced coolant channels between the two sheets. In the drawing of FIG. 16, the coolant channel is cut along its central axis. As shown in FIG. 16, coolant flows into the channel through the inlet 360 and flows out of the channel from the outlet 361 during an operation of the nuclear reactor. In such a case, the coolant current from the outlet 361 restricts a formation of vortexes in the coolant, which flows outside the channel and collides against the mixing blades to make such vortexes if the grid does not form such a coolant current discharged from the outlet 361. The coolant current from the outlet 361 also makes a smooth flow of coolant currents formed by the mixing blades.

In the double strip mixing grid of this invention, the coolant mixing blades are provided along the top edges of the intersecting double strips having coolant channels. Therefore, it is possible to fabricate a double strip mixing grid 410 having only the swirling flow blades, a double strip mixing grid 310 having both the swirling flow blades and the lateral flow blades, or a double strip mixing grid having only the lateral mixing blades.

As described above, the present invention provides a double strip mixing grid for nuclear reactor fuel assemblies. In the present invention, a plurality of inner double strips, each fabricated by integrating two thin sheets together into a single structure having a plurality of coolant channels, are intersected at right angles to form a desired mixing grid. Due to the coolant channels, the mixing grid of this invention effectively mixes the low temperature coolant with the high temperature coolant within a nuclear fuel assembly during an operation of a nuclear reactor, thus improving the thermal efficiency of the nuclear fuel assemblies. This mixing grid also effectively prevents the coolant from being partially overheated, and so it is possible to improve the soundness of nuclear reactors.

In the double strip mixing grid of this invention, the coolant currents discharged from the nozzles of the channels restrict a formation of vortexes in the coolant, which flows outside the channels and collides against the mixing blades of the top edges of the strips to make such vortexes if the grid does not form such coolant currents discharged from the nozzles of the channels. Therefore, the mixing grid of this invention further enhances its coolant mixing function in comparison with conventional mixing grids only having the mixing blades without such channels. This mixing grid thus further improves the thermal efficiency of the nuclear fuel assemblies.

In addition, the double strip mixing grid of this invention is designed to elastically support an elongated fuel rod by the sheets of the double strips collaterally acting as positioning springs. Therefore, each fuel rod set within a cell of the grid of this invention is elastically supported by four positioning springs. This means that the double strip mixing grid of this invention effectively supports a displacement of each fuel rod by two positioning springs in the same manner as that of a conventional grid having both positioning springs and dimples. The mixing grid of this invention thus stably supports each fuel rod during an operation of a nuclear reactor, different from a conventional grid supporting the fuel rod by one positioning spring. In addition, the double strips of the mixing grid of this invention is provided with a vertical slot at a position, where the strip comes into contact with a fuel rod while supporting the fuel rod. The elastic range of the positioning springs of the mixing grid according to this invention is preferably enlarged. Due to the slots, each positioning spring of the double strip is desirably and elastically opened at a position around each slot to support a fuel rod at two support surfaces when the spring supports the fuel rod. Therefore, each positioning spring provides two support surfaces for the fuel rod, thus enlarging the fuel rod contact area of the grid and effectively protecting the fuel rod from a fretting corrosion.

In addition, the intersecting inner strips of the double strip mixing grid of this invention may be preferably and continuously welded together at their intersections through a continuous welding process, in addition to a conventionally performed alternate spot welding process. Therefore, it is possible to improve the mechanical strength of the mixing grid for nuclear fuel assemblies. This finally improves the mechanical strength of the nuclear fuel assemblies.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A double strip mixing grid for nuclear reactor fuel assemblies, comprising a plurality of inner double strips, each fabricated by integrating two thin sheets together into a single structure having a plurality of coolant channels and intersecting each other at a predetermined angle to form a desired mixing grid having a plurality of four-walled cells, wherein each of said strips is partially cut away at predetermined portions from its top edge to form nozzles of said coolant channels, a plurality of mixing blades are provided at top portions of the strips for forcing coolant flowing inside the channels to be actively mixed with coolant flowing outside the channels, thus improving coolant mixing effect of the grid, and said two thin sheets are integrated in such a manner that each of said plurality of mixing blades provided at top portions of the strips faces one of said predetermined portions cut away from top edge to form nozzles for said coolant channels.

2. The double strip mixing grid according to claim 1, wherein a plurality of lateral flow blades are provided at the strips for creating a lateral flow of coolant between the four-walled cells.

3. The double strip mixing grid according to claim 1, wherein a plurality of swirling flow blades are provided at intersections of the strips for creating a swirling motion of coolant at positions around said intersections.

4. The double strip mixing grid according to claim 1, wherein a plurality of lateral flow blades and a plurality of swirling flow blades are provided on the strips for creating both a lateral flow of coolant and a swirling motion of coolant at the same time.

5. The double strip mixing grid according to claim 1, wherein said two sheets of each of the strips are continuously welded together at their junctions.

6. The double strip mixing grid according to claim 1, wherein said two sheets of each of the strips are provided with a plurality of vertical slots at their portions, corresponding to the coolant channels and acting as fuel rod positioning springs.

7. The double strip mixing grid according to claim 6, wherein a cross-sectional area of each of said coolant channels is gradually enlarged in a direction from an inlet to outlet of said channel or varies such that it is maximized at a middle portion of the channel supporting a fuel rod within each four-walled cell.

8. The double strip mixing grid according to claim 1, wherein each of said strips has a thickness ranging from 0.25 mm to 0.40 mm, and each of said channels has a width ranging from 7 mm to 10 mm.

* * * * *